(12) United States Patent
Ferguson et al.

(10) Patent No.: US 11,351,721 B2
(45) Date of Patent: *Jun. 7, 2022

(54) TECHNIQUES FOR SURFACE PREPARATION DURING ADDITIVE FABRICATION AND RELATED SYSTEMS AND METHODS

(71) Applicant: Formlabs, Inc., Somerville, MA (US)

(72) Inventors: Ian Ferguson, Cambridge, MA (US); Konstantinos Oikonomopoulos, Boston, MA (US); Steven Thomas, Cambridge, MA (US); Benjamin FrantzDale, Harvard, MA (US); Nicholas M. Sohn, Somerville, MA (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,932

(22) Filed: May 8, 2020

(65) Prior Publication Data
US 2020/0338810 A1    Oct. 29, 2020

Related U.S. Application Data

(63) Continuation of application No. 16/279,820, filed on Feb. 19, 2019, now Pat. No. 10,682,811, which is a
(Continued)

(51) Int. Cl.
*B29C 64/214*    (2017.01)
*B29C 64/124*    (2017.01)
(Continued)

(52) U.S. Cl.
CPC ............ *B29C 64/124* (2017.08); *B29C 64/20* (2017.08); *B29C 64/214* (2017.08); *B29C 64/35* (2017.08);
(Continued)

(58) Field of Classification Search
CPC ....... B29C 64/124; B29C 64/20; B29C 64/35; B29C 64/214; B33Y 30/00; B33Y 40/00; B29K 2105/0058
See application file for complete search history.

(56) References Cited

U.S. PATENT DOCUMENTS 5,174,931 A    12/1992   Almquist et al.
5,582,876 A    12/1996   Langer et al.
(Continued)

FOREIGN PATENT DOCUMENTS

WO    WO 2006/033621 A1    3/2006
WO    WO 2015/075094 A1    5/2015

OTHER PUBLICATIONS

U.S. Appl. No. 15/248,295, filed Aug. 26, 2016, Ferguson et al.
(Continued)

*Primary Examiner* — Joseph S Del Sole
*Assistant Examiner* — Baileigh Kate Darnell
(74) *Attorney, Agent, or Firm* — Wolf, Greenfield & Sacks, P.C.

(57) ABSTRACT

According to some aspects, an additive fabrication device is provided configured to form layers of material on a build platform, each layer of material being formed so as to contact a container in addition to the build platform and/or a previously formed layer of material. The additive fabrication device may comprise a container and a wiper, wherein the wiper comprises a wiper arm and a wiper blade coupled to said wiper arm using a pivoting coupling.

18 Claims, 10 Drawing Sheets

Related U.S. Application Data continuation of application No. 15/248,295, filed on Aug. 26, 2016, now Pat. No. 10,207,453.

(60) Provisional application No. 62/211,321, filed on Aug. 28, 2015.

(51) Int. Cl.
    *B29C 64/20*     (2017.01)
    *B33Y 30/00*     (2015.01)
    *B29C 64/35*     (2017.01)
    *B33Y 40/00*     (2020.01)
    *B29K 105/00*    (2006.01)

(52) U.S. Cl.
    CPC ...... *B33Y 30/00* (2014.12); *B29K 2105/0058* (2013.01); *B33Y 40/00* (2014.12)

(56) References Cited

U.S. PATENT DOCUMENTS

| | | | |
|---|---|---|---|
| 5,922,364 A | 7/1999 | Young, Jr. | |
| 6,110,409 A * | 8/2000 | Allanic | B33Y 30/00 264/401 |
| 6,764,636 B1 | 7/2004 | Allanic et al. | |
| 10,207,453 B2 | 2/2019 | Ferguson et al. | |
| 10,682,811 B2 | 6/2020 | Ferguson et al. | |
| 2006/0219163 A1 | 10/2006 | Merot et al. | |
| 2007/0074659 A1 | 4/2007 | Wahlstrom | |
| 2014/0000513 A1 | 1/2014 | Leonard et al. | |
| 2015/0224710 A1 | 8/2015 | El-Siblani | |
| 2015/0314527 A1 | 11/2015 | Kline | |
| 2016/0279869 A1 | 9/2016 | Gruber et al. | |
| 2016/0288412 A1 | 10/2016 | Stampfl et al. | |
| 2017/0057177 A1 | 3/2017 | Ferguson et al. | |
| 2019/0263059 A1 | 8/2019 | Ferguson et al. | |

OTHER PUBLICATIONS

U.S. Appl. No. 16/279,820, filed Feb. 19, 2019, Ferguson et al.
EP 16842676.5, Mar. 20, 2019, Extended European Search Report.
PCT/US2016/048941, Nov. 15, 2016, International Search Report and Written Opinion.
PCT/US2016/048941, Mar. 15, 2018, International Preliminary Report on Patentability.
Extended European Search Report for Application No. EP 16842676.5 dated Mar. 20, 2019.
International Search Report and Written Opinion for International Application No. PCT/US2016/048941 dated Nov. 15, 2016.
International Preliminary Report on Patentability for International Application No. PCT/US2016/048941 dated Mar. 15, 2018.

* cited by examiner

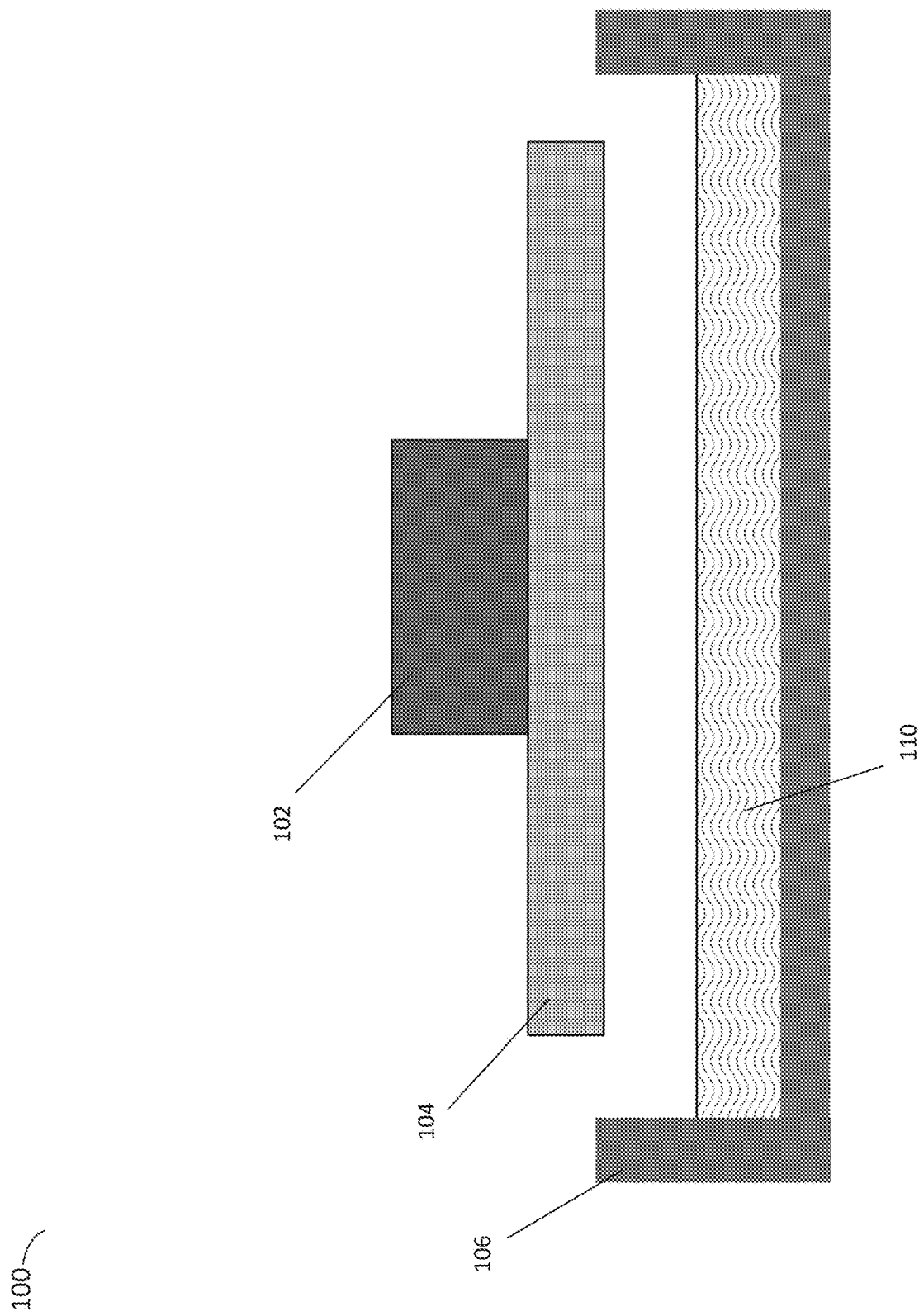

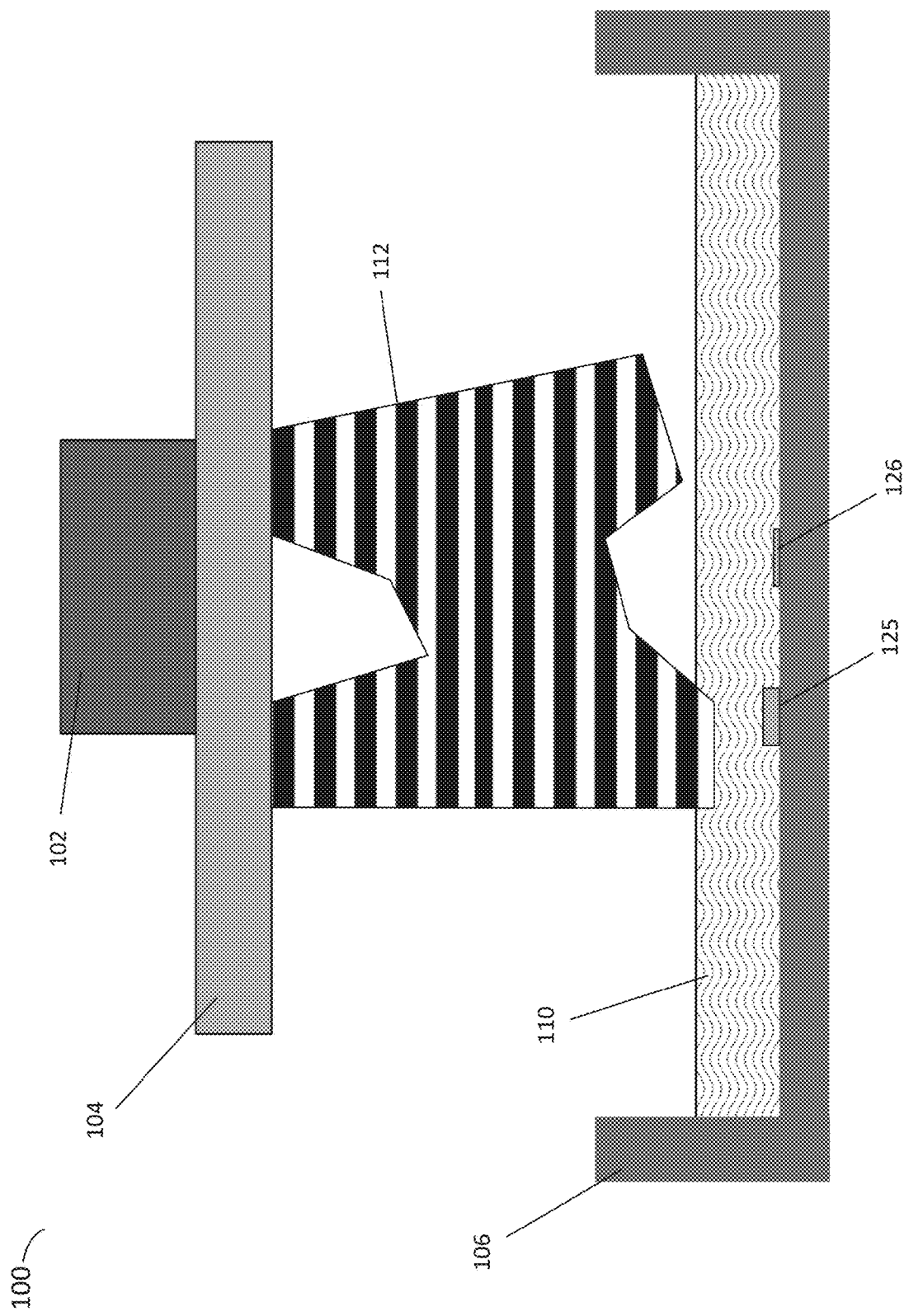

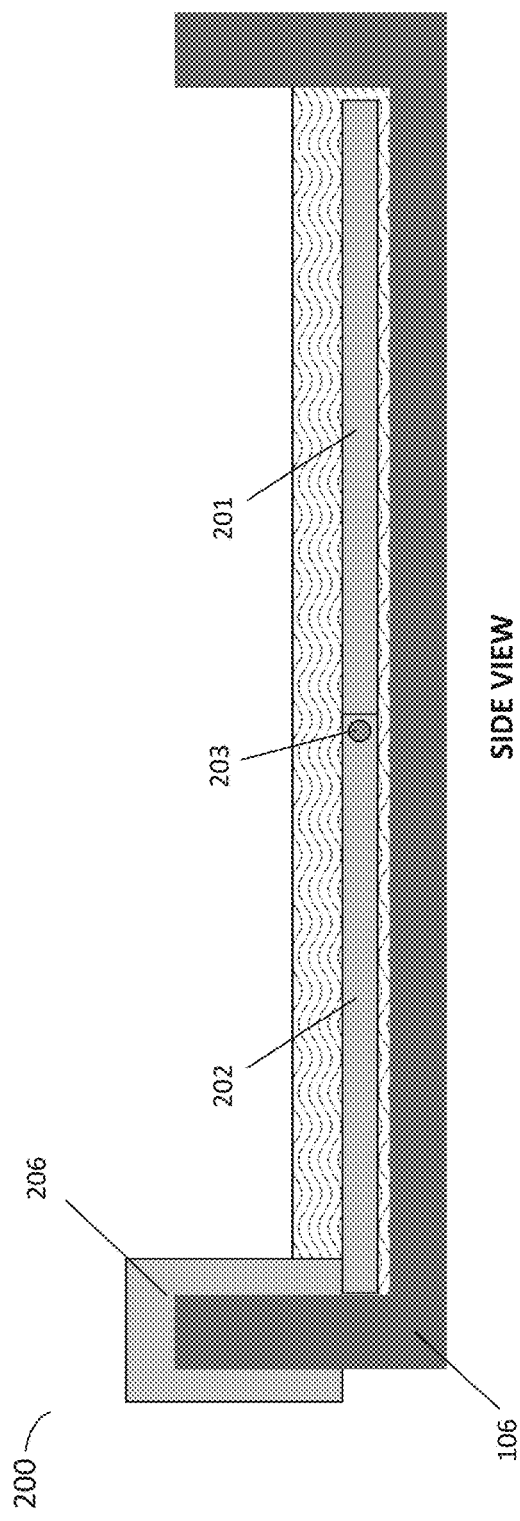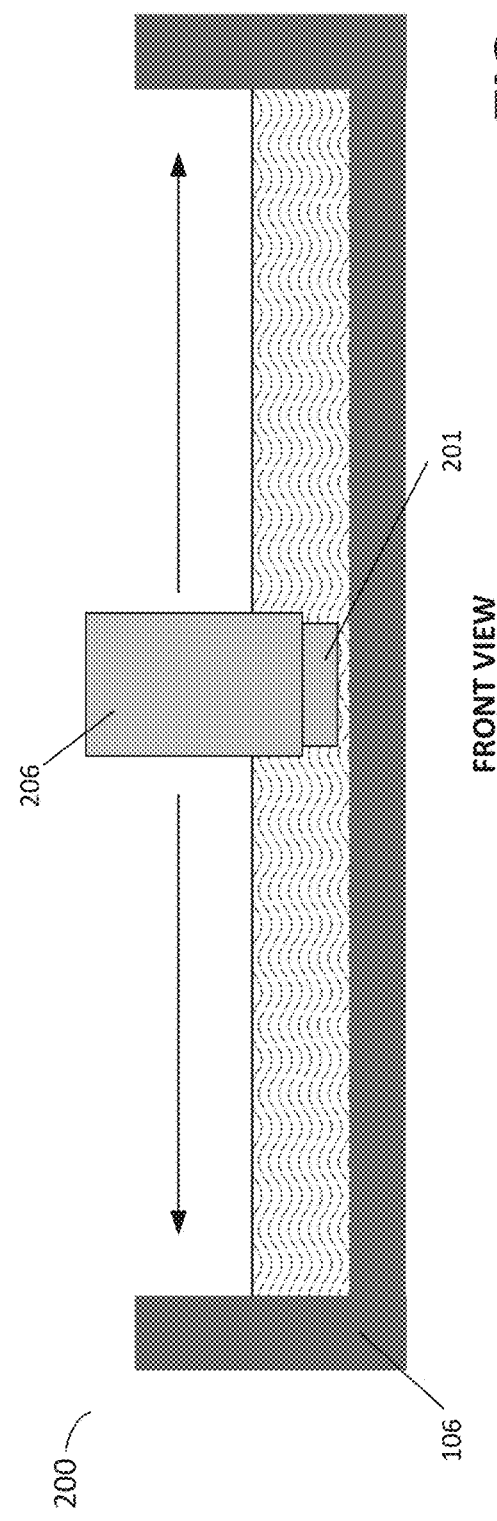

TECHNIQUES FOR SURFACE PREPARATION DURING ADDITIVE FABRICATION AND RELATED SYSTEMS AND METHODS

CROSS REFERENCE TO RELATED APPLICATIONS

The present application claims the benefit as a continuation under 35 U.S.C. § 120 of U.S. patent application Ser. No. 16/279,820, filed Feb. 19, 2019, which claims the benefit as a continuation under 35 U.S.C. § 120 of U.S. patent application Ser. No. 15/248,295 (now U.S. Pat. No. 10,207,453), filed Aug. 26, 2016, which claims the benefit under 35 U.S.C. § 119(e) of U.S. Provisional Patent Application No. 62/211,321, filed Aug. 28, 2015, each of which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or to the bottom surface of the build platform.

SUMMARY

The present application relates generally to systems and methods for cleaning and wiping surfaces within an additive fabrication (e.g., 3-dimensional printing) device.

According to some aspects, an additive fabrication device is provided configured to form layers of material on a build platform, each layer of material being formed so as to contact a container in addition to the build platform and/or a previously formed layer of material. The additive fabrication device may comprise a container and a wiper, wherein the wiper comprises a wiper arm and a wiper blade coupled to said wiper arm using a pivoting coupling.

According to some aspects, a wiper is provided configured to be used within an additive fabrication device. The wiper may comprise a support structure configured to be attached to one or more components of the additive fabrication device, a wiper arm coupled to the support structure having a long axis aligned in a first direction, and a wiper blade coupled to said wiper arm using a pivoting coupling. The wiper blade may have a long axis aligned in the first direction and may comprise a first surface and a second surface aligned perpendicularly to the first direction, the second surface being longer than the first surface. The wiper blade may further comprise a void space located between said first and second surfaces and configured to hold liquid.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1B depict an illustrative additive fabrication system, according to some embodiments;

FIG. 1C depicts resin pieces that are not adhered to a part after separation of the part from the container, during additive fabrication, according to some embodiments;

FIGS. 2A-2B illustrate two views of an illustrative wiper, according to some embodiments;

DETAILED DESCRIPTION

As discussed above, some additive fabrication techniques form solid objects by solidifying (also referred to herein as "curing") a liquid, such as a photopolymer resin. Sometimes when using such techniques, a region of liquid may be cured to a solid or partially solid state but fail to adhere to the object being fabricated. This may occur for a variety of reasons, such as an incompletely performed curing operation and/or adhesion of cured or partially cured material to a surface other than the object being fabricated (e.g., to a container). When this occurs, the cured or partially cured material may subsequently interfere with the successful forming of a remainder of the object, such as by adhering to an undesired location on the object and/or by inhibiting the correct formation of subsequent material (e.g., by blocking the path of a radiation source, by mechanically sticking to the object and thereby introducing undesirable forces, etc.).

Figure 1B:
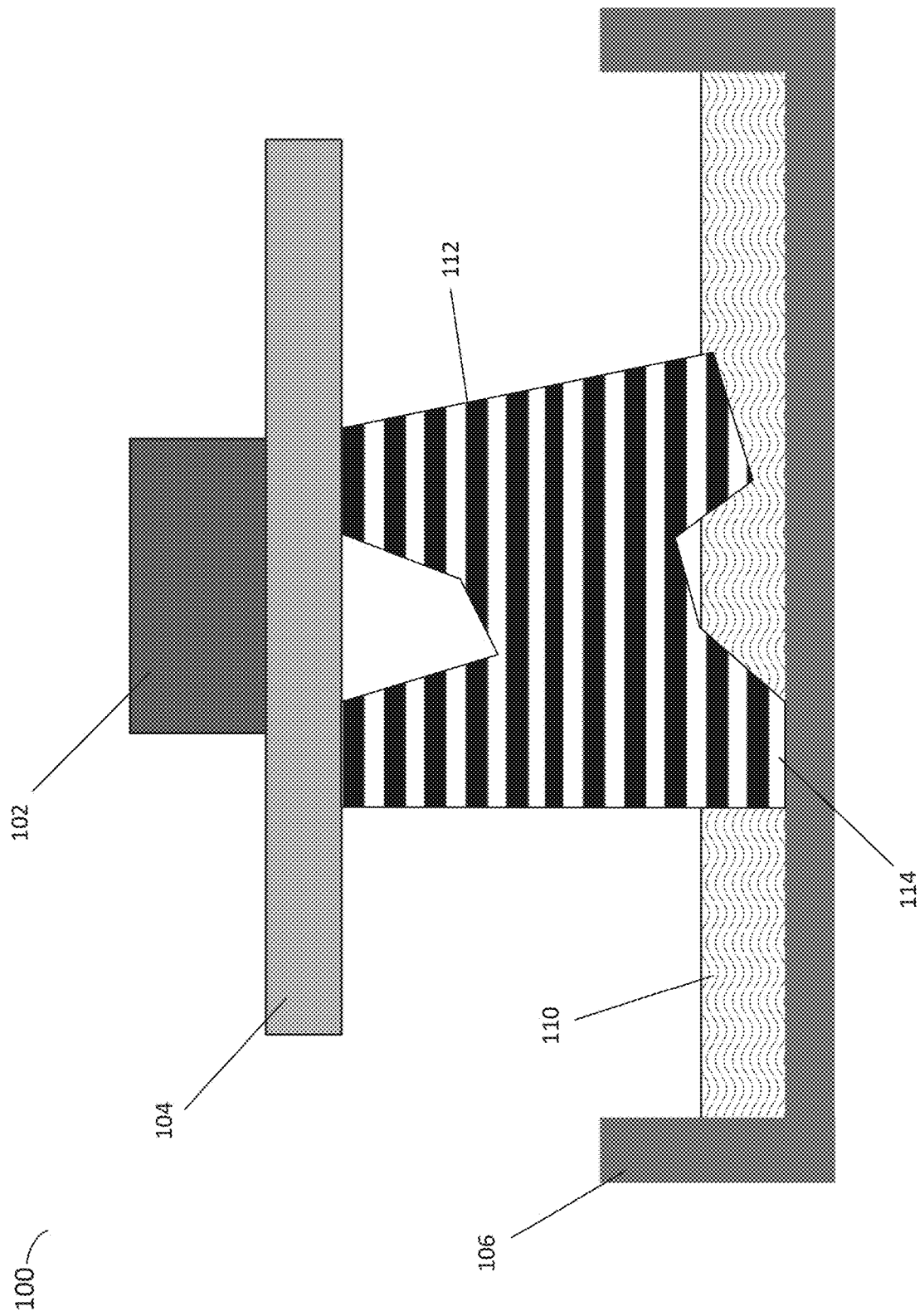

To depict an example of cured and/or partially cured material failing to adhere to an object being fabricated, an illustrative additive fabrication system is depicted in FIGS. 1A-1C. Illustrative stereolithographic printer 100 forms a part in a downward facing direction on a build platform such that layers of the part are formed in contact with a surface of a container in addition to a previously cured layer or the build platform. In the example of FIGS. 1A-1C, stereolithographic printer 100 comprises build platform 104, container 106 and liquid resin 110. A downward facing build platform 104 opposes the floor of container 106, which contains a photopolymer resin 110. FIG. 1A represents a configuration of stereolithographic printer 100 prior to formation of any layers of a part on build platform 104.

As shown in FIG. 1B, a part 112 may be formed layerwise, with the initial layer attached to the build platform 104. In FIG. 1B, the layers of the part 112 are each formed from the same material but are shown in alternating colors merely to visually distinguish them in this example. The container's base surface may be transparent to actinic radiation, such that radiation can be targeted at portions of the thin layer of liquid photocurable resin resting on the base surface of the container. Exposure to actinic radiation cures a thin layer of the liquid resin, which causes it to harden. The layer 114 is at least partially in contact with both a previously formed layer and the surface of the container 106 when it is formed. The top side of the cured resin layer typically bonds to either the bottom surface of the build platform 104 or with the previously cured resin layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

Following the curing process, a separation process is typically conducted so as to break any bonds that may have been produced between the cured material of layer 114 and the bottom of container 106. Various techniques may be employed to separate the layers, include rotation and/or sliding the container relative to the build platform. As one example, build platform 104 may be moved away from the container to reposition the build platform for the formation of a new layer and/or to impose separation forces upon any bonds between cured and/or partially cured material and the bottom of the container. In some implementations, the container 106 may be mounted onto a support base such that the container can be moved along a horizontal axis of motion (left or right in FIG. 1B) to introduce additional separation forces.

As discussed above, in some cases partially and/or fully cured regions of the photopolymer resin may not adhere to the object being fabricated. For instance, when a layer of resin is cured in contact with a previously formed solid layer (e.g., layer 114) and the bottom of container 106, and then subsequently separated from the container, some resin may nonetheless still adhere to the bottom of the container after the separation. This resin may, for instance, be a thin layer or partially and/or fully cured resin that is at least somewhat adhered to the container, and/or may include pieces of partially and/or fully cured resin that have adhered to the container.

FIG. 1C illustrates two pieces of partially cured and/or fully cured resin 125 and 126 that are not adhered to the part 112 after separation of the part from the container. For clarity, the pieces 125 and 126 are shown as having a larger size than might typically be expected within the scale of the figure. In general, such resin pieces may have a size equal to or less than the thickness of a layer produced by the additive fabrication device, though may sometimes be of a larger size. For instance, an additive fabrication device that forms layers having a thickness of 50 µm (0.05 mm) may, in some cases, produce partially cured and/or fully cured resin pieces having a dimension between 0 and 50 µm. Irrespective of their size, the partially cured and/or fully cured resin pieces may be partially or fully adhered to the container 106, or may not be adhered to the container at all and may be "floating" in the resin 110. These resin pieces may negatively impact the formation of subsequent layers of the part 112, such as by adhering to one or more of the subsequent layers or otherwise. In extreme cases, such resin pieces can block a subsequent layer from being formed by impinging on the incident actinic radiation, thereby leading to a missing portion in the part once fabricated.

The inventors have recognized and appreciated that a moveable wiper positioned to move over the surface of a container of an additive fabrication device can remove partially cured and/or fully cured resin pieces from an area in which subsequent layers of a part are formed. In particular, a moveable wiper arm that is constructed to have some degree of flexibility can be positioned to apply a force to the container of an additive fabrication device without experiencing the mechanical difficulties that can be encountered when a rigid wiper is configured to move across a surface. For example, imperfections in the surface or wiper can cause mechanical restriction of the movement of the wiper, and in some extreme cases, could cause the wiper to stop entirely.

According to some embodiments, a moveable wiper may include two portions connected via a joint having rotational freedom. The wiper blade may be configured to contact a surface of a resin container so that, when the wiper is moved laterally across the surface of the container, the wiper blade contacts the surface. The joint may allow one of the wiper portions (referred to as the wiper "blade") to rotate away from the surface of a container over which the wiper may be moved. In some cases, the other portion of the wiper (referred to as the wiper "arm") is configured to not make contact with the container. The joint between the arm the blade may allow the blade to rest on the container surface whilst providing some force onto the surface. If motion of the wiper across the surface of the container produces resistance against the wiper, the rotational joint allows the blade to move in a direction away from the surface to allow the wiper to continue its motion substantially unimpeded.

According to some embodiments, the wiper arm and/or wiper blade may comprise a flexible material to provide additional flexibility and/or to allow for additional vertical motion over and above that provided by the rotational joint. The wiper arm and wiper blade may have different material compositions, or may have the same material composition. In some cases, the wiper blade may be made from a more flexible material than the wiper arm.

The inventors have recognized and appreciated that an amount of force necessary to dislodge a partially or fully cured piece of resin from a container using a wiper will depend upon the area of the resin that is adhered to the container. For example, smaller resin pieces may generally be successfully removed using less force than would be necessary to remove larger resin pieces. As a result, by applying a chosen force upon the wiper toward the container, embodiments may be "tuned" in the extent to which the wiper detaches comparatively smaller areas of residual material from the bottom of the container and the extent to which the wiper leaves comparatively larger areas of residual material attached to the bottom of the container for removal by some other process and/or by manual intervention. The force can be transmitted to the wiper blade by configuring the shape and/or rigidity of the wiper arm, for example, such that the wiper blade is pushed onto the container by the wiper arm with the desired force.

According to some embodiments, an additive fabrication device may include a container having a portion shaped to catch pieces of resin moved by a wiper arm. For example, a "trap" or otherwise recessed portion of a container may be positioned close to, or at, an edge of the container and the wiper configured to move from the opposing end of the container and over the recessed portion. Thus, the pieces of resin moved by the wiper may be moved into the recessed portion. The recessed portion may be a portion of the container in which additive fabrication does not take place. In this manner, the pieces of resin may be eliminated from affecting fabrication of subsequent layers by the device.

The inventors have further recognized and appreciated that selecting an amount of resin present in a container of an additive fabrication device close to that of the fabricated layer height (e.g., 0.05 mm) may tend to reduce forces necessary to induce separation between an object being fabricated and the bottom of a container. While liquid resin may be supplied to the container to maintain a resin depth close to that of the fabricated layer height, this may be insufficient to produce a uniform fluid level across the container. For instance, photopolymer resin can be relatively viscous and may take a period of time to reach a steady and uniform fluid level greater than is desirable for efficient functioning of an additive fabrication device. This time period may cause unwanted delays or, if not accounted for, failures or defects during object formation in subsequent steps. Furthermore, interactions between the surface of the bottom of a container and the chemistry of the photopolymer resin may be such that photopolymer resin tends to bead on the bottom of the container, rather than spreading across it over time. The inventors have recognized and appreciated that a wiper may be configured to overcome these difficulties and thereby aid in producing a uniform thin layer of photopolymer resin within the container. According to some embodiments, the wiper may perform this function while also providing the above-described benefits with respect to removal of partially and/or fully cured resin adhered to the container or otherwise remaining in the resin after formation of a layer of solid resin on a part.

According to some embodiments, a wiper may include a void space also referred to herein as a "resin-retaining chamber." In some use cases, a void space may be provided within a wiper blade portion of the wiper. The chamber may be bounded at an upper surface (furthest from the container and substantially parallel to the surface of the container) while including vents in one or both sides of the chamber oriented substantially perpendicular to the surface of the container. As the wiper moves through the resin, the resin moving through the vents may be output at a substantially uniform level in the container due to interactions between fluid pressures within the void space.

Following below are more detailed descriptions of various concepts related to, and embodiments of, techniques for surface preparation for additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIGS. 2A-2B illustrate two views of an illustrative wiper, according to some embodiments. In the example of FIGS. 2A-2B, system 200 is illustrated in which a wiper is positioned over the end of container 106 and configured to slide across the base surface of the container (i.e. the surface on which the liquid resin rests) in the directions of the arrows shown in FIG. 2B. The wiper may, or may not, make contact with the base surface. The wiper includes a support structure 206, a wiper blade 201 and a wiper arm 202. The wiper blade and wiper arm are connected by a pivoting coupling 203.

According to some embodiments, the pivoting coupling 203 may be any suitable mechanical connection having at least some rotational freedom. For instance, the coupling 203 may include a pin joint (also sometimes called a "revolute joint" or a "hinge joint"), a ball and socket joint, a knuckle joint, or combinations thereof. According to some embodiments, the coupling 203 may permanently affix the wiper blade 201 to the wiper arm 202, and/or may attach to the wiper blade 201 in some other way, such as via a removable snap fit connection.

According to some embodiments, the wiper may be removably mounted onto the container 106. Such a removable attachment may facilitate removing a container and installing the same or a different container. According to some embodiments, the height of support structure 206 may be selected so as to push wiper blade 201 towards the bottom of the container.

According to some embodiments, the wiper blade 201 may be coupled to the wiper arm at a location along the axis of the wiper blade 201 orthogonal to the wiper motion direction shown in FIG. 2B. In such a configuration, a connection formed by the coupling 203 forms an axis of rotation along the length of the coupling 203 around which the wiper blade 201 may rotate. That is, the wiper blade may include a portion that is located below the wiper arm in addition to a portion that extends beyond the wiper arm. For example, the coupling may be located approximately at a midpoint of the wiper arm along the axis of the blade orthogonal to the wiper motion, such that approximately half of the wiper blade is located beneath the wiper arm (and therefore between the wiper arm and the container). Such a configuration may allow the wiper blade to contact the container whilst the wiper arm provides structural support but does not contact the container.

In addition to rotational flexibility, according to some embodiments the wiper arm 202 may comprise one or more flexible materials to provide for additional vertical motion and flexibility or, as described above, to introduce a force between the wiper blade 201 and the bottom of the container by arranging the arm and blade components of the wiper to apply such a force once mounted to the side of the container.

According to some embodiments, wiper blade 201 may include at least one wiper edge that extends below the main body of the wiper blade 201 substantially across the long axis of the wiper blade 201. Such an edge may contact a container to move liquid photopolymer resin to desired locations.

Figure 3A:
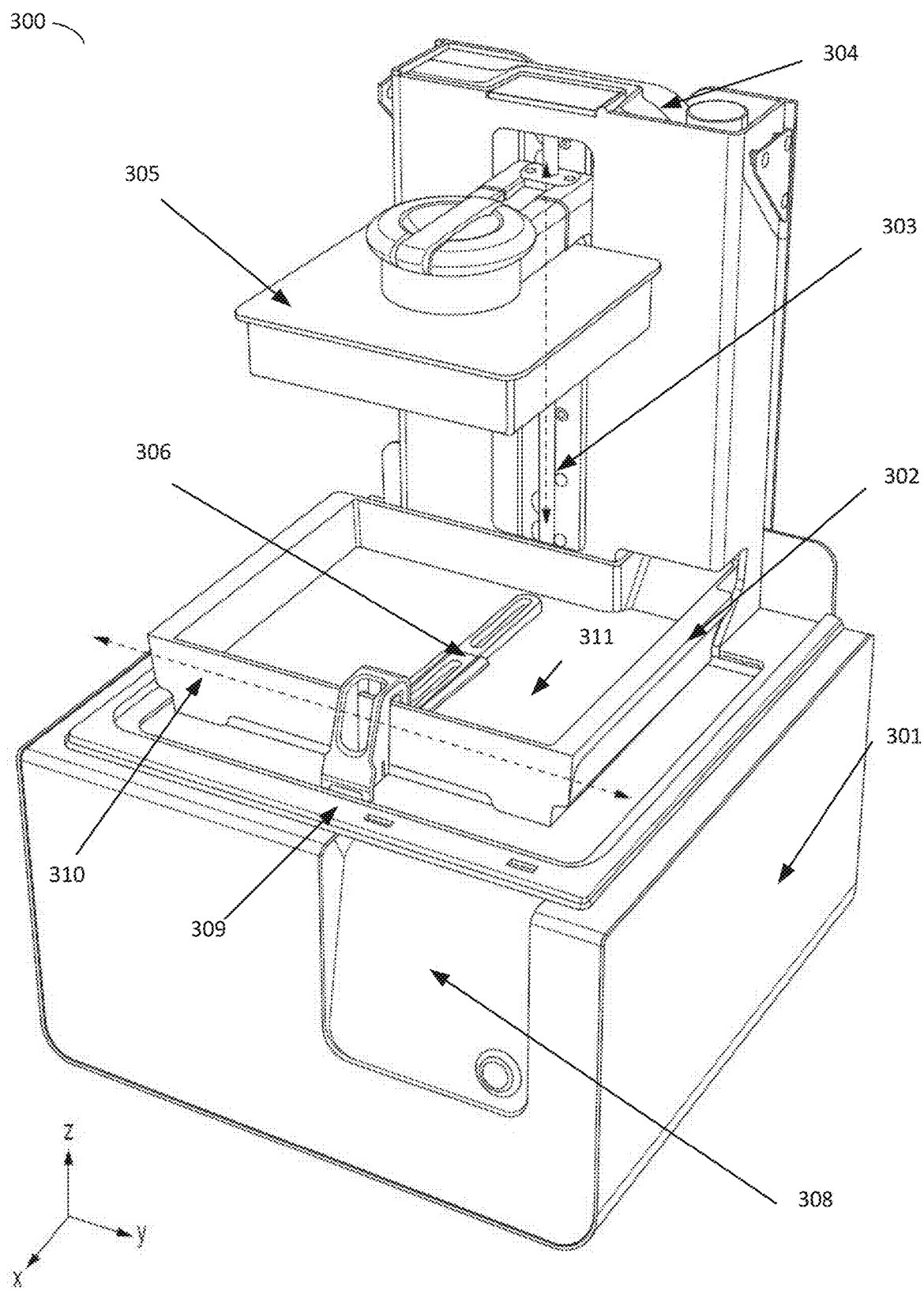
FIGS. 3A-3B are schematics showing two different views of an illustrative stereolithographic printer that includes a wiper, according to some embodiments.
Figure 3B:
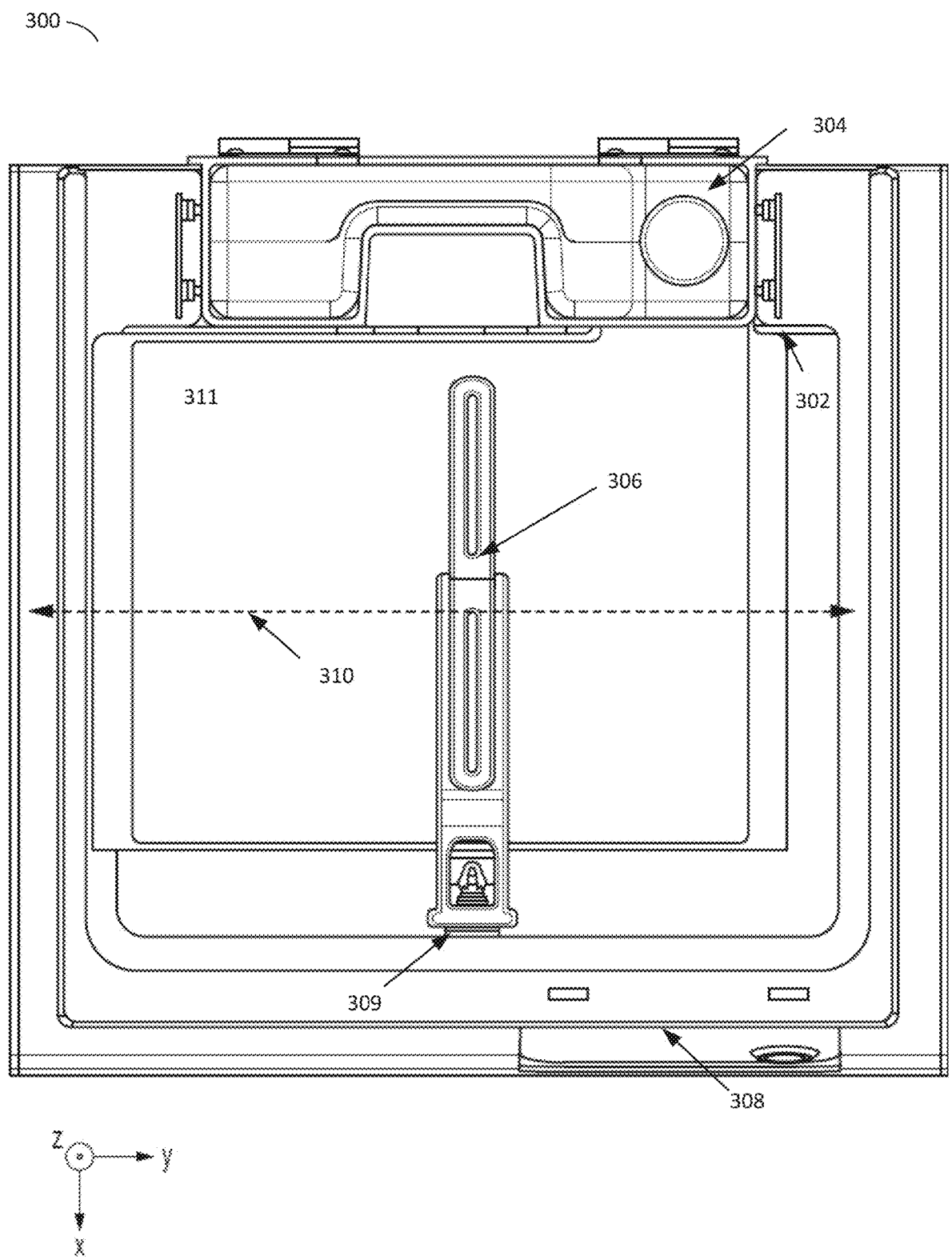

FIGS. 3A-3B depict an illustrative stereolithographic printer that includes a wiper, according to some embodiments. Illustrative stereolithographic printer 300 comprises a support base 301, a display and control panel 308, and a reservoir and dispensing system for photopolymer resin 304. The support base 301 may contain various mechanical, optical, electrical, and electronic components that may be operable to fabricate objects using the system. During operation, photopolymer resin may be dispensed from the dispensing system 304 into container 302. Build platform 305 may be positioned along the vertical axis 303 such that the bottom facing layer of an object being fabricated, or the bottom facing layer of build platform 305 itself, is a desired distance from the bottom 311 of container 302. The bottom 311 of the container 302 may be advantageously transparent to actinic radiation generated by a source located within the support base (not shown) such that liquid photopolymer resin located between the bottom 311 of container 302 and the bottom facing portion of build platform 305 or an object being fabricated thereon, may be exposed to the radiation. Upon exposure to such actinic radiation, the liquid photopolymer may be cured and attached to the bottom facing portion of build platform 305 or to an object being fabricated thereon. (FIGS. 3A-B represent a configuration of stereolithographic printer 301 prior to formation of any layers of an object on build platform 305.) A wiper 306 is additionally provided, capable of motion along the horizontal axis of motion 310 and which may be removably mounted onto the support base at 309. The wiper may be coupled to one or more actuators (e.g., stepper motors, belts attached to motor (s), etc.) that produce lateral movement of the wiper across the surface of the container.

As discussed above, to successfully remove undesirable material within an additive fabrication device, in some cases it may be desirable for a wiper to move through a volume that might be occupied by an object being fabricated by the device. Additionally, it may be desirable to move a wiper in an additive fabrication device through photopolymer resin that may obstruct or inhibit motion of the wiper due to fluid forces. Embodiments of a wiper blade described herein may have one or more of these desirable characteristics and/or may exhibit other desirable characteristics. In some embodiments, a wiper blade may be mounted using a rotationally flexible connection so as to provide a limited degree of rotational freedom during operation. In some embodiments, the wiper blade may be configured with features that provide structural stability.

Figure 4:
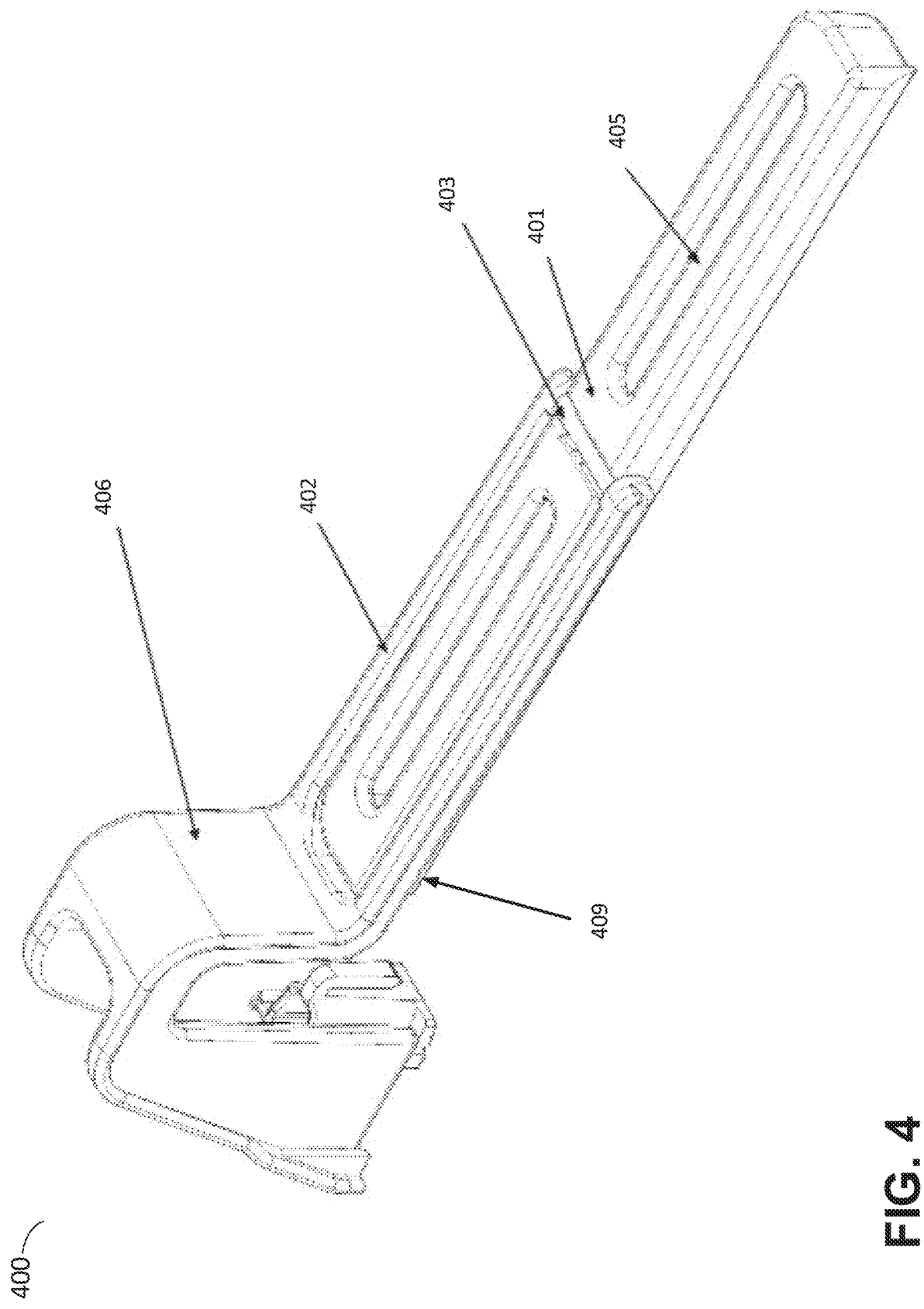
FIG. 4 is a schematic of an illustrative wiper, according to some embodiments.

Illustrative wiper 306 shown in FIG. 3A is depicted in further detail in FIG. 4, according to some embodiments. In the example of the wiper 400 of FIG. 4, the wiper blade 401 is mounted to a wiper arm 402 via a pin 403. The pin 403 may permanently affix the wiper blade 401 to the wiper arm 402, and/or may attach to the wiper blade 401 in some other way, such as via a removable snap fit connection. As discussed above, according to some embodiments, a wiper blade 401 may be mounted at a location offset approximately halfway down the axis of the wiper blade 401 orthogonal to wiper motion 310. In such a configuration, a connection formed by the pin 403 forms an axis of rotation along the length of the pin 403 around which the wiper blade 401 may rotate, and a portion of the wiper blade (portion 409 in FIG. 4) is located beneath the wiper arm.

According to some embodiments, the wiper arm 402 may include one or more "accommodating" features that limit the extent to which wiper arm 402 interferes with the rotation of wiper blade 401 about the pin 403. As shown in the example of FIG. 4, one such accommodating feature may be in the form of a separation or gap within the wiper arm 402 so as to create a forked structure. In other embodiments, such accommodating features may include portions of a wiper arm that are not within the desired range of motion of the wiper 401, such as above the wiper arm.

According to some embodiments, the wiper arm 402 may include a vertical feature 406. Vertical feature 406 may provide clearance for the wiper arm 402 above the walls of a container (not pictured in FIG. 4), while substantially reducing the amount of vertical clearance above the wiper blade 401 required during motion.

In some embodiments, rotational flexibility from pin 403 may be provided using mounting devices such as a sufficiently flexible material in the wiper arm 402 and/or in the connection between the wiper arm 402 and the wiper blade 401. In addition to rotational flexibility, some embodiments of the present invention may utilize a flexible material in the wiper arm 402 to provide for additional vertical motion and flexibility or, as described below, to introduce a force between the wiper blade 401 and the bottom of the container.

Figure 5:
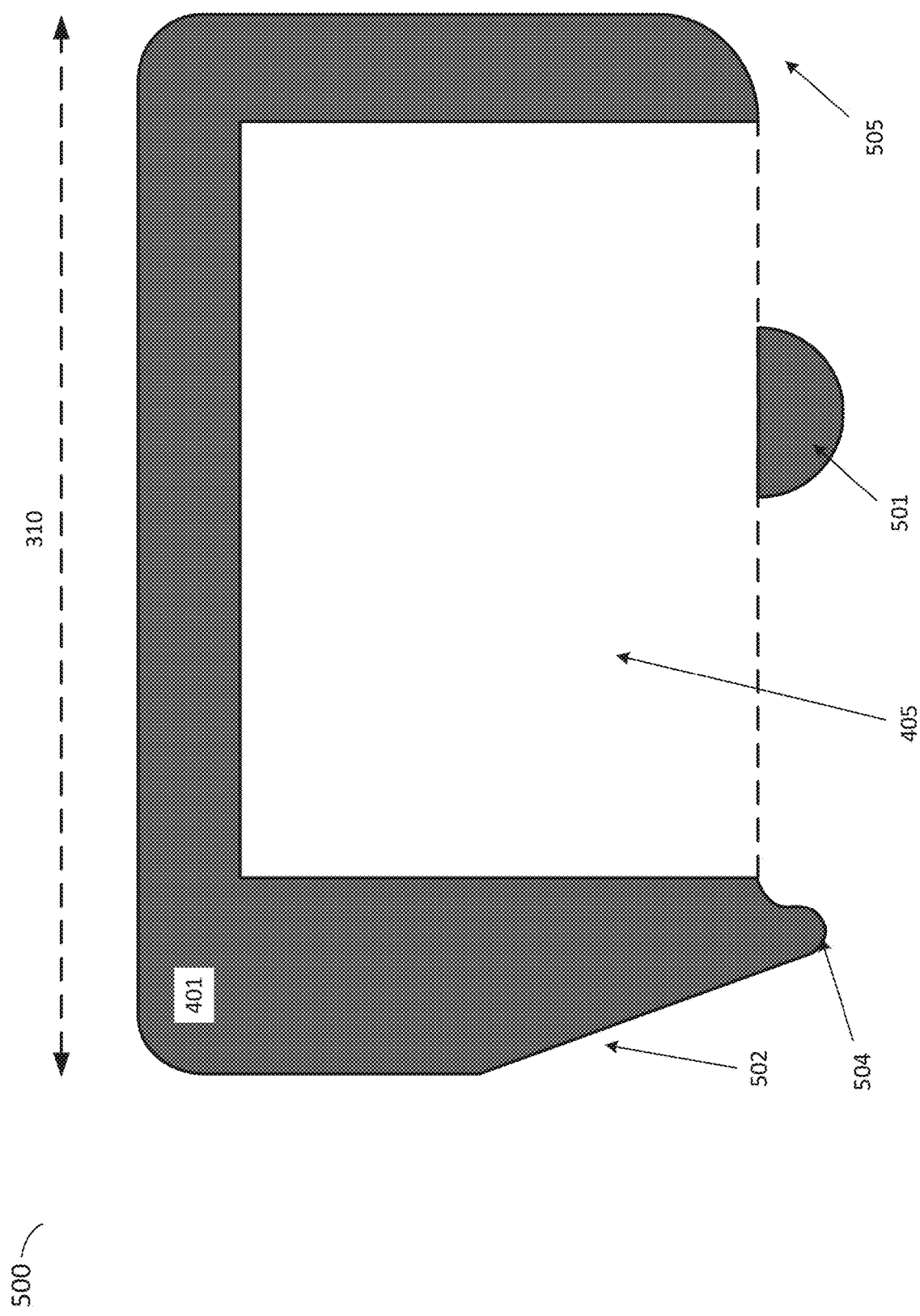
FIG. 5 depicts a cross sectional view of an illustrative wiper blade along the horizontal axis of motion, according to some embodiments.

A cross section of wiper blade 401 shown in FIG. 4 is depicted in FIG. 5. FIG. 5 depicts a cross sectional view 500 of wiper blade 401 along the horizontal axis of motion 310. Wiper blade 401 includes at a wiper edge 504 that extends below the main body of the wiper blade 401 substantially across the long axis of the wiper blade 401 (e.g., in directions into and/or out of the page). Embodiments following the example shown in FIG. 5 may utilize the wiper edge 504 to interact with the bottom 311 of container 302, including moving liquid photopolymer or other materials to desired locations. In order to maximize the effectiveness of such an operation, it may be desirable that the wiper edge 504 be maintained flush to the bottom 311 of the container 302 during operation. As such, it may be particularly advantageous to combine wiper edge 504 with an additional stabilizing feature, 501, in order to improve the stability of the wiper blade 401, and thus wiper edge 504, during operation. In FIG. 5, the wiper blade is shown in cross section, and in order to clearly depict void space 405, points at which the feature 501 attaches to the wiper blade are not shown.

In some embodiments, pin 403 mounting the wiper blade 401 to the wiper arm 402 may not provide sufficient constraint to the wiper blade 401 to prevent at least some undesired rotation around the long axis of the wiper blade 401. To mitigate this problem, the wiper edge feature 504 and stabilizing feature 501, alone or in combination, provide additional constraints to the motion of the wiper blade 401 against the bottom surface 311 of the container 302. In some embodiments, supporting feature 501 may extend the full length of the wiper along the long axis. However, in some embodiments, supporting feature 501 may be present in only particular sections of the wiper blade 401, such as being located at the middle and/or ends of the long axis of the wiper 401. Additional sloping features 502 may be added to the wiper blade 401 in order to reduce the resistance of the wiper blade 401 when moving through the liquid material contained within the tank.

The configuration depicted in FIG. 5 may offer several advantages. As an example, as mentioned above, it may be desirable that the wiper edge 504 be maintained at a uniform distance from or flush to the bottom of the container during operation. One way to maintain such a uniform distance is to ensure the supporting structure constrains the motion of the wiper blade 401 in relation to the orientation of the container, particularly with respect to the bottom of said container. Maintaining such an orientation (sometimes referred to as "tramming") however, may be a source of operator and/or mechanical difficulty. In contrast, the limited range of rotation allowed by mounting using pin 403 significantly reduces the extent to which the wiper arm 402 and wiper blade 401 must be properly aligned with the bottom 311 and side surfaces of the resin container 302, while maintaining effective contact between the wiper edge 504 and bottom 311 of the container 301. In addition, by affixing the wiper blade 401 to the wiper arm 402 at a location towards the middle of the wiper blade 401, the wiper arm 402 forms a cantilevered mount for the wiper blade 401 from only one side of the wiper 401, while still providing for sufficient support during the operation of the wiper blade 401 in the additive fabrication processes. Such a mount may tend to allow for a more easily removable container 401, as well as reducing the complexity of the mechanisms required to mount the wiper blade 401 onto the supporting structures.

As discussed above, it may be desirable for a wiper to incorporate a void space, also referred to herein as a "resin-retaining chamber." As discussed above, a void space may be provided within wiper blade 201. In the example of FIG. 5, a chamber 405 is formed within the wiper blade 401 with walls on four sides provided by the wall containing the wiper edge 504, the opposing wall with gap 505, and walls connecting the previous two walls along the sides.

In the example of FIG. 4, the lower bound of the chamber 405 is left open so as to allow for the flow or resin into and out of the chamber 405 through gap 505, as described in further detail below. The upper bound of the chamber 405 may be enclosed, but the wiper blade may include one or more vents at locations above the expected resin level, so as to allow for pressure relief due to changing fluid levels within the chamber. In some embodiments, resin-retaining chamber 405 may comprise substantially all of the interior volume of a wiper blade 401 and extends across the long axis of the wiper blade 401 to cover the full width of the object building area. In some embodiments, resin-retaining chamber 405 may be restricted with internal dividers and/or limits. In some embodiments, the inventors have found it may be advantageous for the internal volume of the wiper blade 401 used as a resin-retaining chamber 405 to be between 5 cm$^3$ and 25 cm$^3$, such as between 10 cm$^3$ and 20 cm$^3$, such as approximately 13.8 cm$^3$.

Illustrations of various stages of the operation of a wiper as described above in relation to FIGS. 2 and 4-5 are depicted in FIGS. 6A-6D, according to some embodiments.

Figure 6A:
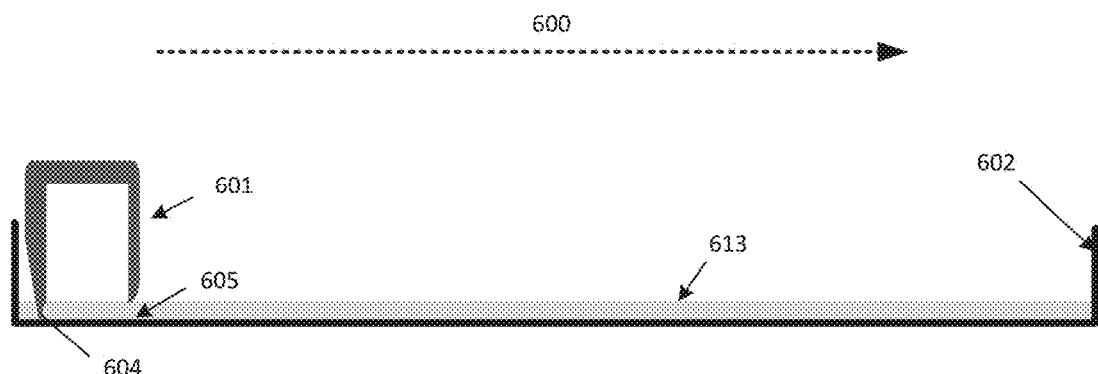
FIGS. 6A-6D depict various stages during operation of a wiper, according to some embodiments.

In the example of FIG. 6A, a wiper blade 601 is illustrated in an initial state prior to motion 600 across container 602. At this stage, a layer of photopolymer resin 613 covers the bottom of the container 602. This layer of liquid resin may be partially or fully depleted due to prior formation of one or more layers of an object being fabricated.

Figure 6B:
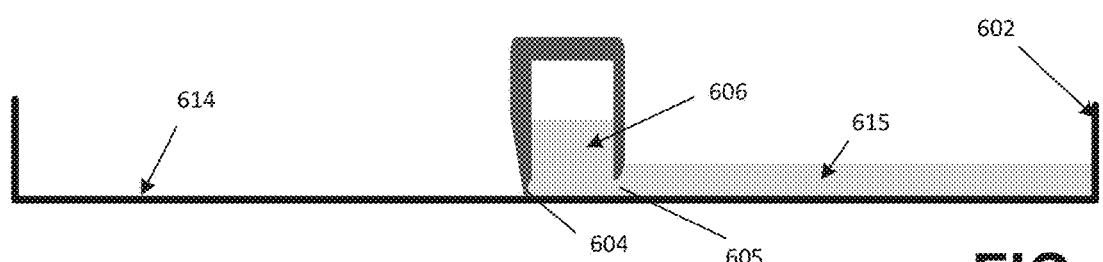

FIG. 6B illustrates a subsequent intermediate state after the wiper blade 601 has moved partially across the container 602 in a direction such that the wiper edge 604 trails the direction of motion 600. The motion of the wiper blade 601 through the resin 603 causes at least a portion of the resin to flow through gap 605 up into the resin-retaining chamber 606. Due to the limited clearance between wiper edge 604 and the bottom of the container 602, only a limited portion of said resin within the resin-retaining chamber 606 may be capable of flowing out between the bottom of the container 602 and the wiper edge 604. Accordingly, a portion of the resin flowing into the resin-retaining chamber 606 through wiper edge 604 may tend to be retained by the chamber during the motion 600 of the wiper blade, while wiper edge 604 may leave a region 614 of the bottom of the container 602 substantially clear of resin behind the direction of motion. Accordingly, at the completion of the motion 600, as illustrated in FIG. 6C, resin may be contained within the resin-retaining chamber 606 and the bottom of container 602 in region 614 may be substantially cleared of resin.

Figure 6C:
Figure 6D:
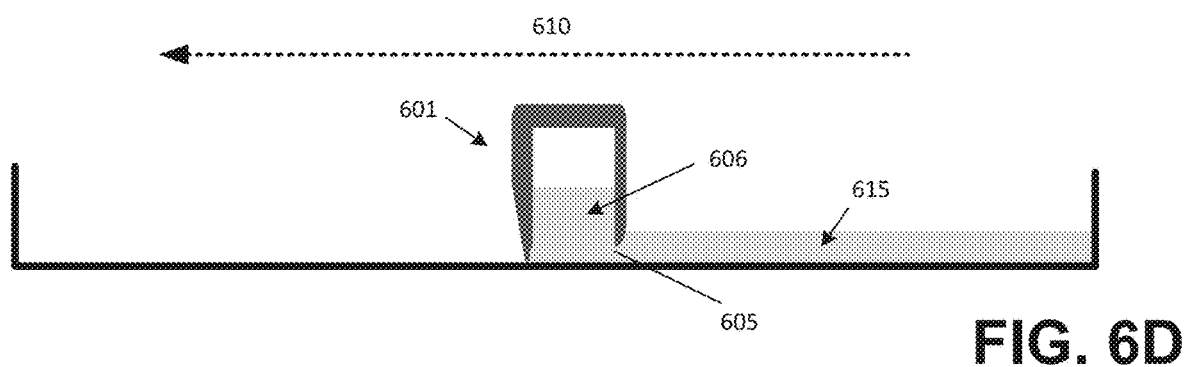

In the example of FIGS. 6A-6D, following the completion of the wiping motion 600 in FIG. 6C the wiper may carry out a recoating step utilizing resin temporarily held within the resin-retaining chamber in order to enhance the recoating process. In said recoating step, shown partially completed in FIG. 6D, the motion of wiper blade 601 may be reversed such that the gap 605 trails the direction of motion 610. With the termination of motion 600, resin 610 is free to outflow from the resin-retaining chamber through the gap 605. By moving wiper blade 601 along path 610, resin flowing out from the resin-retaining chamber may be distributed across the bottom of the container 602 in a new layer of resin 615. Embodiments providing for such deposition may advantageously be capable of establishing a substantially uniform layer of resin 615 more quickly than may form without intervention, particularly in embodiments in which resin 615 is more viscous than water.

As discussed above, in some embodiments a wiper may be configured to remove partially cured material adhered to the bottom of a container. In some cases, the wiper exerts pressure from a wiper edge against the bottom of the container.

Figure 7A:
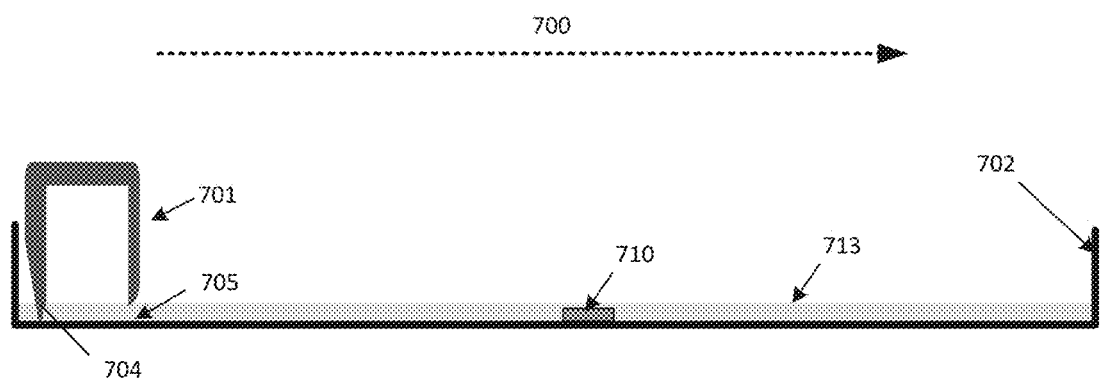
FIGS. 7A-7B depict use of an illustrative wiper to dislodge material not adhered to a part being fabricated, according to some embodiments.
Figure 7B:
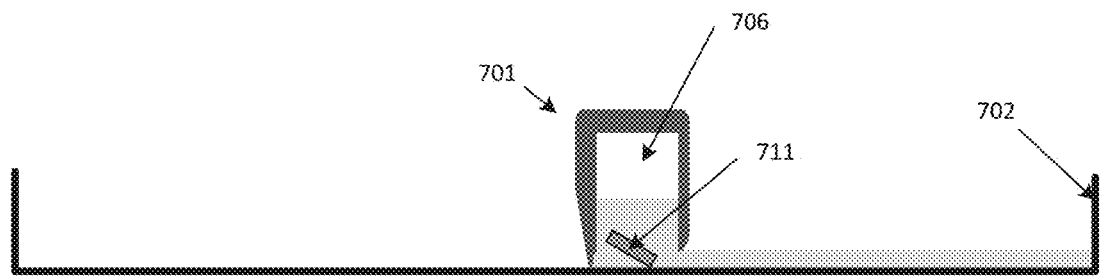

To illustrate removal of residual cured or semi-cured materials, FIGS. 7A-7B depict a wiper performing such removal. In the example of FIGS. 7A-7B, wiper blade 701, and thus wiper edge 704, may be moved across the bottom of the container 702 in direction 700, as shown in FIG. 7A. During such motion, wiper blade 701 may exert a downwards force against wiper edge 704 and/or the bottom of the container. A force applied via wiper edge 704 may be provided in various ways, such as by use of a flexible wiper arm (e.g., wiper arm 202 and/or wiper arm 402) placed under tension.

According to some embodiments, the height of a structure (e.g., support structure 206) on which a wiper blade 701 is mounted may be selected so as to push wiper blade 701 towards the bottom of the container. Such mounting may cause force to be exerted against the bottom of the container by the wiper edge 704 (in addition to a stabilizing feature such as feature 501, should the wiper arm include such a feature).

According to some embodiments, the wiper blade 701 may be flexibly mounted onto a wiper arm to allow for pressure to be applied to the surface of the container while maintaining alignment between the path of the wiper blade 701 and the bottom of the container 702. In some implementations, an amount of pressure applied may be determined based at least in part on the height at which the support structure mounts to wiper blade 701. Once wiper edge 704 reaches the residual material 710, forces are applied to the residual material 710 by the wiper edge 704, potentially dislodging it from the container.

As will be appreciated by those having skill in the art, the extent to which an area of residual material 710 is attached to the bottom of the container, and thus the amount of force needed to dislodge it, may tend to increase as the area of the residual material 710 increases. In some cases, a downwards force exerted via wiper edge 704 may be insufficient to remove residual material 710. In such cases, the flexible nature of the mounting of wiper blade 701, as discussed above, may allow wiper blade 701 to pass over the residual material 710. In other cases, the force applied may be sufficient to break the adhesive attachment between residual material 710 and the bottom of the container. As a result, by applying a chosen downwards force via wiper edge 704, embodiments of the invention may be "tuned" in the extent to which small areas of residual material 710 are detached from the bottom of the container and the extent to which larger areas of residual material 710 are left attached to the bottom of the container for removal by some other process or manual intervention. As may be appreciated, the amount of force to be applied may depend upon additional factors, such as the nature of the bottom of the container and the geometry of the wiper edge 704. According to some embodiments, the inventors have determined that a force between 4-6 Newtons, as measured at the central pivot point of the wiper blade 701 and the bottom of the container, may provide for optimal removal of residual material 710. The inventors have further found that the use of such force may be most advantageously applied through a wiper edge 704 having a rounded profile, such as wiper edge 504 shown in FIG. 5.

In some embodiments, freed residual material 711 may be left to circulate within the resin 713 within the container, to be collected later, if needed, by some other process. The inventors have observed that such free-floating cured material may cause substantially fewer difficulties in later operations than residual material 710 adhered to the bottom of the container. In some embodiments, as shown in FIG. 7B, freed residual material 711 may also be temporarily contained within the resin-retaining chamber 706 of the wiper blade 701. This material may be moved to the edge of the container and left there during subsequent fabrication.

Figure 8:
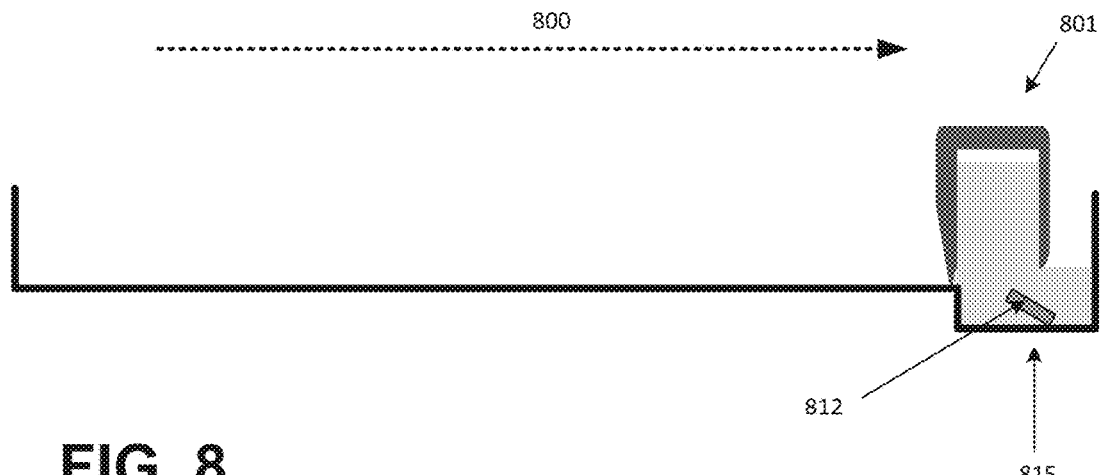
FIG. 8 depicts transport of dislodged material into a recessed portion of a container, according to some embodiments.

Alternatively, as shown in FIG. 8, freed residual material 812 may be relocated by the motion 800 of wiper blade 801 to a recessed region 815 of the container not used for the exposure of photopolymer resin to actinic radiation. Said recessed region 815 may, in some embodiments, be at a lower position than the level of the remainder of the container in order to help prevent freed residual material 812 from leaving the location 815.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to form layers of material on a build platform, each layer of material being formed so as to contact a container in addition to the build platform and/or a previously formed layer of material, the additive fabrication device comprising:
   a wiper, the wiper comprising:
      a wiper arm having a length and a first end, the length of the wiper arm extending in a first direction and being longer than a width of the first end;
      a wiper blade having a length and a second end, the length of the wiper blade extending in the first direction and being longer than a width of the second end, the second end of the wiper blade being flexibly mounted onto the first end of the wiper arm, and the wiper blade comprising a chamber bound at least in part by first and second sides of the wiper blade and an upper surface of the wiper blade; and
      at least one stabilizing feature configured to contact the container and constrain motion of the wiper blade against the container when the wiper moves over the container.

2. The additive fabrication device of claim 1, wherein the wiper blade comprises at least one opening in the upper surface through which liquid may flow from the container into the chamber, and/or from the chamber into the container.

3. The additive fabrication device of claim 1, further comprising the container, and wherein the at least one stabilizing feature causes the wiper blade to maintain a fixed distance above the container when the wiper moves over the container.

4. The additive fabrication device of claim 3, wherein the at least one stabilizing feature is attached to a lower surface of the wiper blade.

5. The additive fabrication device of claim 1, wherein the wiper blade is formed from a more flexible material than the wiper arm.

6. The additive fabrication device of claim 1, wherein the chamber of the wiper blade has a volume between 5 cm$^3$ and 25 cm$^3$.

7. The additive fabrication device of claim 1, wherein the wiper blade includes one or more vents within the first side and/or the second side of the chamber.

8. The additive fabrication device of claim 7, wherein the additive fabrication device is configured to maintain a level of a photopolymer liquid within the container at a first height, wherein the wiper is configured to move across the container while making contact with the container, and wherein the one or more vents of the wiper blade are arranged wholly above the first height.

9. The additive fabrication device of claim 1, wherein the chamber of the wiper blade comprises one or more internal dividers.

10. The additive fabrication device of claim 1, wherein the at least one stabilizing feature is arranged at a first end of the wiper blade.

11. A wiper configured to be used within an additive fabrication device comprising a container, the wiper comprising:
- a support structure configured to be attached to one or more components of the additive fabrication device;
- a wiper arm flexibly mounted onto the support structure, the wiper arm having a long axis aligned in a first direction and having a first end;
- a wiper blade having a long axis aligned in the first direction and having a second end flexibly coupled to the first end of said wiper arm, and comprising a chamber bound at least in part by first and second sides of the wiper blade and an upper surface of the wiper blade; and
- at least one stabilizing feature configured to contact the container and constrain motion of the wiper blade against the container when the wiper moves over the container.

12. The wiper of claim 11, wherein the wiper blade comprises at least one opening in the upper surface through which liquid may flow from the container into the chamber, and/or from the chamber into the container.

13. The wiper of claim 11, wherein the at least one stabilizing feature is attached to a lower surface of the wiper blade.

14. The wiper of claim 11, wherein the wiper blade is formed from a more flexible material than the wiper arm.

15. The wiper of claim 11, wherein the chamber of the wiper blade has a volume between 5 cm$^3$ and 25 cm$^3$.

16. The wiper of claim 11, wherein the wiper blade includes one or more vents within the first side and/or the second side of the chamber.

17. The wiper of claim 11, wherein the chamber of the wiper blade comprises one or more internal dividers.

18. The wiper of claim 11, wherein the wiper arm is flexibly mounted onto said support structure at a second end of the wiper arm, and wherein the at least one stabilizing feature is arranged at a first end of the wiper blade.

* * * * *